United States Patent
Makke et al.

(10) Patent No.: US 11,893,978 B2
(45) Date of Patent: Feb. 6, 2024

(54) SPEECH RECOGNITION IN A VEHICLE

(71) Applicant: Ford Global Technologies, LLC, Dearborn, MI (US)

(72) Inventors: Omar Makke, Oakland, MI (US); Oleg Gusikhin, Commerce Township, MI (US); Haysam M. Kadry, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 17/400,624

(22) Filed: Aug. 12, 2021

(65) Prior Publication Data
US 2023/0050579 A1 Feb. 16, 2023

(51) Int. Cl.
*G10L 15/06* (2013.01)
*G10L 15/26* (2006.01)
(Continued)

(52) U.S. Cl.
CPC ............ *G10L 15/063* (2013.01); *G06N 20/00* (2019.01); *G10L 15/20* (2013.01); *G10L 15/22* (2013.01);
(Continued)

(58) Field of Classification Search
CPC ....... G10L 15/063; G10L 15/20; G10L 15/22; G10L 15/26; G10L 2015/223; G10L 15/01; G10L 15/06; G06N 20/00; G06N 3/044; G06N 3/045; G06N 3/0464; G06N 3/047; G06N 3/0475; G06N 3/094; H04R 5/02; H04R 2499/13; H04R 5/027
See application file for complete search history.

(56) References Cited

U.S. PATENT DOCUMENTS 7,487,084 B2 2/2009 Aaron et al.
10,115,392 B2 10/2018 Sims et al.
(Continued)

FOREIGN PATENT DOCUMENTS

JP 2012173702 A * 9/2012

OTHER PUBLICATIONS

Kvinevskiy, I., Bedi, S., & Mann, S. (2020). Detecting machine chatter using audio data and machine learning. The International Journal of Advanced Manufacturing Technology, 108, 3707-3716. (Year: 2020).*

(Continued)

*Primary Examiner* — Bhavesh M Mehta
*Assistant Examiner* — Philip H Lam
(74) *Attorney, Agent, or Firm* — Brandon Hicks; Bejin Bieneman PLC

(57) ABSTRACT

An audio sample including speech and ambient sounds is transmitted to a vehicle computer. Recorded audio is received from the vehicle computer, the recorded audio including the audio sample broadcast by the vehicle computer and recorded by the vehicle computer and recognized speech from the recorded audio. The recognized speech and text of the speech are input to a machine learning program that outputs whether the recognized speech matches the text. When the output from the machine learning program indicates that the recognized speech does not match the text, the recognized speech and the text are included in a training dataset for the machine learning program.

18 Claims, 5 Drawing Sheets

(51) Int. Cl.
*G10L 15/22* (2006.01)
*H04R 5/02* (2006.01)
*G06N 20/00* (2019.01)
*G10L 15/20* (2006.01)

(52) U.S. Cl.
CPC ............... *G10L 15/26* (2013.01); *H04R 5/02* (2013.01); *G10L 2015/223* (2013.01); *H04R 2499/13* (2013.01)

(56) References Cited

U.S. PATENT DOCUMENTS

| | | | |
|---|---|---|---|
| 10,629,224 B1* | 4/2020 | Alonzo, III | G06F 16/951 |
| 2008/0039964 A1* | 2/2008 | Charoenruengkit | G11B 27/28 |
| | | | 381/104 |
| 2009/0319268 A1 | 12/2009 | Aumont et al. | |
| 2014/0067392 A1* | 3/2014 | Burke | G10L 15/22 |
| | | | 704/E15.001 |
| 2016/0119730 A1* | 4/2016 | Virtanen | H04L 65/80 |
| | | | 381/56 |
| 2017/0103756 A1* | 4/2017 | Kobayashi | G10L 15/30 |
| 2019/0370398 A1* | 12/2019 | He | G06N 20/00 |
| 2021/0097983 A1* | 4/2021 | Griebel | H04L 9/0643 |
| 2021/0241780 A1* | 8/2021 | Quillen | G06N 3/02 |
| 2021/0358496 A1* | 11/2021 | Sukumar | G10L 21/02 |
| 2022/0058463 A1* | 2/2022 | Yokoyama | G06N 3/04 |
| 2022/0108570 A1* | 4/2022 | Tabata | G01M 7/00 |
| 2022/0223169 A1* | 7/2022 | Luo | G08G 1/01 |

OTHER PUBLICATIONS

Donahue, C., et al., "Adversarial Audio Synthesis," ICLR, Feb. 9, 2019, 16 pages.
Gao, Y., et al., "Voice Impersonation Using Generative Adversarial Networks," Electrical and Computer Engineering Department, Carnegie Mellon University, Feb. 19, 2018, 5 pages.
Graves, A., et al., "Towards End-to-End Speech Recognition with Recurrent Neural Networks," Proceedings of the 31st International Conference on Machine Learning, Beijing, China, 2014, 9 pages.
Khan, R., et al., "Analysis of Vehicle Voice Recognition Performance in Response to Background Noise and Gender Based Frequency," SAE International, Jun. 5, 2017, 6 pages.
Taheri, E., et al., "Survey of prognostics methods for condition-based maintenance in engineering systems," Department of Aerospace Engineering, University of Michigan, Ann Arbor, MI, Dec. 3, 2019, 74 pages.
Zhang, Y., et al., "Very Deep Convolutional Networks for End-To-End Speech Recognition," Massachusetts Institute of Technology, Oct. 10, 2016, 5 pages.

* cited by examiner

SPEECH RECOGNITION IN A VEHICLE

BACKGROUND

Vehicles can be equipped with computing devices, networks, sensors and controllers to acquire data within a vehicle and to operate the vehicle based on the data. Vehicle sensors can provide data concerning user operation of the vehicle, including voice commands to actuate subsystems. Operation of the vehicle and/or subsystems thereof can be based upon acquiring text parsing of audio data collected within the vehicle.

DETAILED DESCRIPTION

Figure 1:
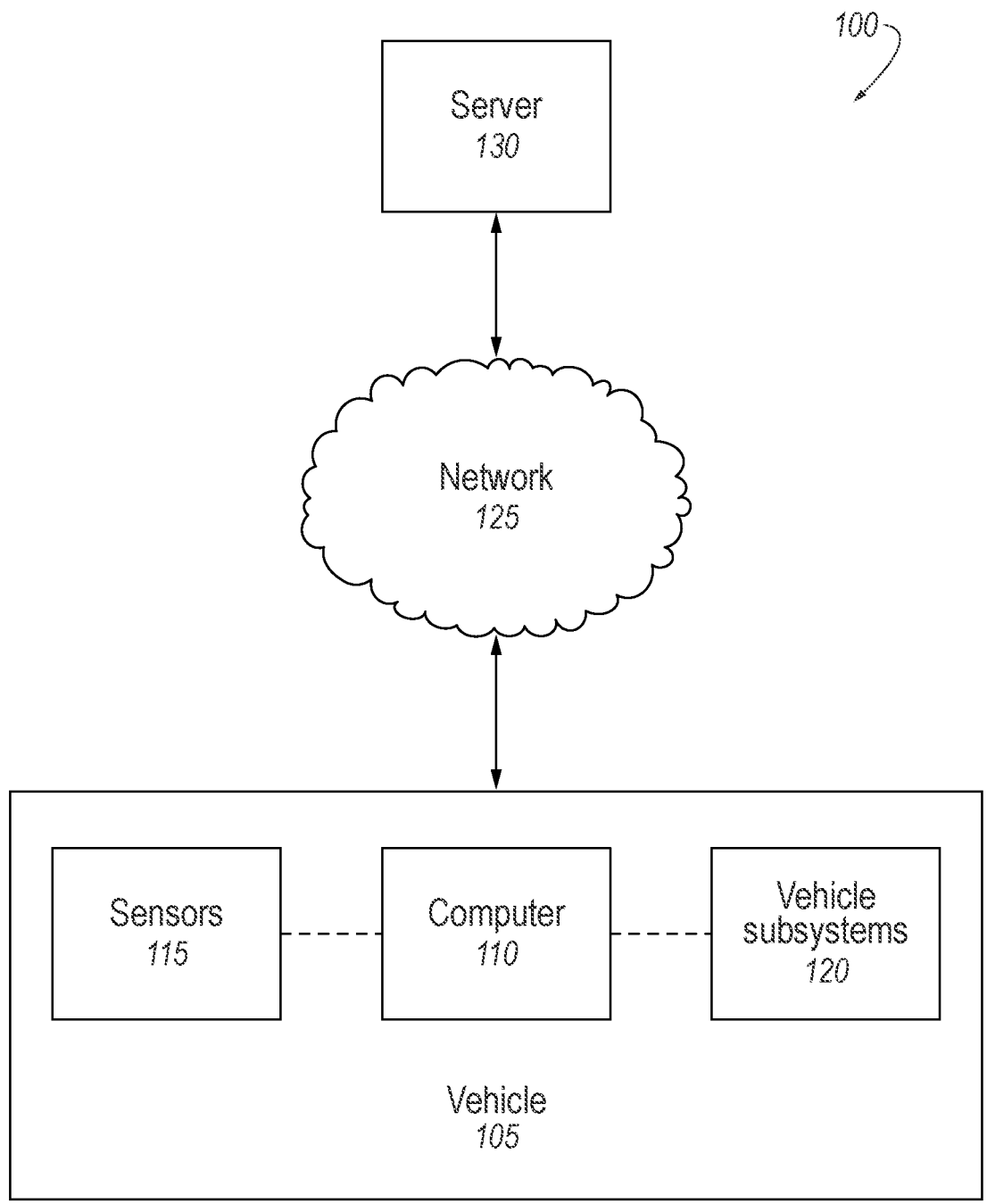
FIG. 1 is a block diagram of an example system for identifying text in an audio sample.

A system includes a computer including a processor and a memory, the memory storing instructions executable by the processor to transmit an audio sample including speech and ambient sounds to a vehicle computer, receive, from the vehicle computer, recorded audio including the audio sample broadcast by the vehicle computer and recorded by the vehicle computer and recognized speech from the recorded audio, input the recognized speech and text of the speech to a machine learning program that outputs whether the recognized speech matches the text, and, when the output from the machine learning program indicates that the recognized speech does not match the text, include the recognized speech and the text in a training dataset for the machine learning program.

The instructions can further include instructions to generate the audio sample with a second machine learning program trained to output audio samples including speech and ambient sounds.

The audio sample can include speech of a voice command to actuate one or more vehicle subsystems.

The instructions can further include instructions to receive, from the vehicle computer, a message indicating that the vehicle computer did not recognize speech from the recorded audio broadcast and to include the audio sample and the message in the training dataset.

The instructions can further include instructions to receive a message from the vehicle computer indicating that a vehicle in which the vehicle computer is located is stationary, and then transmit the audio sample to the vehicle computer.

The machine learning program is further trained to output a detection of a vibration from a vehicle subsystem from the recorded audio, and the instructions can further include instructions to detect a variation with the vehicle subsystem based on the output detected vibration and a prognostics model of the vehicle subsystem.

The instructions can further include instructions to transmit the detected variation to the vehicle computer.

The instructions can further include instructions to input the detected vibration in the training dataset for the machine learning program.

The vehicle computer can be further programmed to, upon receiving the audio sample, to actuate a speaker to broadcast the audio sample and to actuate a microphone to record the broadcast audio sample.

The vehicle computer can be further programmed to input the recorded audio to a speech recognition program trained to output speech recognized from the recorded audio.

The vehicle computer can be further programmed to actuate each of a plurality of speakers to broadcast the audio sample and to actuate the microphone to record the audio sample broadcast from each of the plurality of speakers.

The instructions can further include instructions to transmit the audio sample to each of a plurality of vehicle computers, each vehicle computer located in a respective vehicle, and to receive recorded audio and recognized speech from each of the plurality of vehicle computers.

The instructions can further include instructions to input respective recognized speech and text of the speech from each of the plurality of vehicle computers to the training dataset of the machine learning program.

The instructions can further include instructions to retrain the machine learning program with the training dataset and to transmit the retrained machine learning program to the vehicle computer.

A method includes transmitting an audio sample including speech and ambient sounds to a vehicle computer, receiving, from the vehicle computer, recorded audio including the audio sample broadcast by the vehicle computer and recorded by the vehicle computer and recognized speech from the recorded audio, inputting the recognized speech and text of the speech to a machine learning program that outputs whether the recognized speech matches the text, and, when the output from the machine learning program indicates that the recognized speech does not match the text, including the recognized speech and the text in a training dataset for the machine learning program.

The method can further include generating the audio sample with a second machine learning program trained to output audio samples including speech and ambient sounds.

The method can further include receiving, from the vehicle computer, a message indicating that the vehicle computer did not recognize speech from the recorded audio broadcast and including the audio sample and the message in the training dataset.

The method can further include receiving a message from the vehicle computer indicating that a vehicle in which the vehicle computer is located is stationary, and then transmitting the audio sample to the vehicle computer.

The machine learning program is further trained to output a detection of a vibration from a vehicle subsystem from the recorded audio, and the method can further include detecting a variation with the vehicle subsystem based on the output detected vibration and a prognostics model of the vehicle subsystem.

The method can further include transmitting the detected variation to the vehicle computer.

The method can further include inputting the detected vibration in the training dataset for the machine learning program.

The method can further include transmitting the audio sample to each of a plurality of vehicle computers, each vehicle computer located in a respective vehicle, and receiving recorded audio and recognized speech from each of the plurality of vehicle computers.

The method can further include inputting respective recognized speech and text of the speech from each of the plurality of vehicle computers to the training dataset of the machine learning program.

The method can further include retraining the machine learning program with the training dataset and transmitting the retrained machine learning program to the vehicle computer.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Users can provide voice commands to a vehicle to actuate one or more vehicle subsystems. For example, the user can provide a voice command to actuate an entertainment subsystem to adjust a volume of output audio. In another example, the user can provide a voice command to actuate a climate control subsystem to adjust an internal cabin temperature. Accurate detection of speech in the voice commands allows the computer to actuate the correct subsystems to follow the voice command Training speech recognition programs to accurately detect speech in audio improves operation of the vehicle by actuating subsystems intended by the user.

Building a dataset to train a speech recognition program in an external server with data from a plurality of vehicles can improve the accuracy of the speech recognition program relative to a speech recognition program trained using data from a single vehicle. Moreover, generating audio samples with text, accents, and ambient sounds that may not be easily produced in a real-world vehicle environment can improve the speech recognition program when these less common sounds occur in a vehicle. A computer in a vehicle can receive an audio sample from the server and broadcast the audio sample in the interior of the vehicle. Then, the computer can record the broadcast audio and input the audio to a speech recognition program, a same program as stored in the server. The computer can send the output of the speech recognition program, the recorded audio, and the original audio sample to the server, and the server can input the received data to the training dataset. Thus, the server can use the data from the vehicle to retrain the speech recognition program in the server and can send updates to the retrained speech recognition program to the computer, improving the speech recognition program in the computer of the vehicle.

FIG. 1 is a block diagram of an example system 100 for recognizing speech in broadcast audio. The system 100 includes a vehicle 105 including a vehicle computer 110. The vehicle computer 110 includes a processor and a memory. The memory includes one or more forms of computer 110 readable media, and stores instructions executable by the vehicle computer 110 for performing various operations, including as disclosed herein. For example, the computer 110 can be a generic computer 110 with a processor and memory as described above and/or may include an electronic control unit ECU or controller for a specific function or set of functions, and/or a dedicated electronic circuit including an ASIC that is manufactured for a particular operation, e.g., an ASIC for processing sensor 115 data and/or communicating the sensor 115 data. In another example, the computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 110. The memory can be of any type, e.g., hard disk drives, solid state drives, servers 130, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110. The computer 110 may include programming to operate one or more of vehicle brakes, propulsion e.g., control of acceleration in the vehicle 105 by controlling one or more of an internal combustion engine, electric motor, hybrid engine, etc., steering, climate control, interior and/or exterior lights, etc., as well as to determine whether and when the computer 110, as opposed to a human operator, is to control such operations. Additionally, the computer 110 may be programmed to determine whether and when a human operator is to control such operations. The computer 110 may include or be communicatively coupled to, e.g., via a vehicle network such as a communications bus as described further below, more than one processor, e.g., included in components such as sensors 115, electronic control units (ECUs) or the like included in the vehicle 105 for monitoring and/or controlling various vehicle components, e.g., a powertrain controller, a brake controller, a steering controller, etc. The computer 110 is generally arranged for communications on a vehicle communication network that can include a bus in the vehicle 105 such as a controller area network CAN or the like, and/or other wired and/or wireless mechanisms. Alternatively or additionally, in cases where the computer 110 actually comprises a plurality of devices, the vehicle communication network may be used for communications between devices represented as the computer 110 in this disclosure. Further, as mentioned below, various controllers and/or sensors 115 may provide data to the computer 110 via the vehicle communication network.

Vehicles 105, such as autonomous or semi-autonomous vehicles, typically include a variety of sensors 115. A sensor 115 is a device that can obtain one or more measurements of one or more physical phenomena. Some sensors 115 detect internal states of the vehicle 105, for example, wheel speed, wheel orientation, and engine and transmission variables. Some sensors 115 detect the position or orientation of the vehicle 105, for example, global positioning system GPS sensors 115; accelerometers such as piezo-electric or microelectromechanical systems MEMS; gyroscopes such as rate, ring laser, or fiber-optic gyroscopes; inertial measurements units IMU; and magnetometers. Some sensors 115 detect the external world, for example, radar sensors 115, scanning laser range finders, light detection and ranging LIDAR devices, and image processing sensors 115 such as cameras. A LIDAR device detects distances to objects by emitting laser pulses and measuring the time of flight for the pulse to travel to the object and back. Some sensors 115 are communications devices, for example, vehicle-to-infrastructure V2I or vehicle-to-vehicle V2V devices. Sensor 115 operation can be affected by obstructions, e.g., dust, snow, insects, etc. Often, but not necessarily, a sensor 115 includes a digital-to-analog converter to converted sensed analog data to a digital signal that can be provided to a digital computer 110, e.g., via a network. Sensors 115 can include a variety of devices, and can be disposed to sense and environment, provide data about a machine, etc., in a variety of ways. For example, a sensor 115 could be mounted to a stationary infrastructure element on, over, or near a road. Moreover, various controllers in a vehicle 105 may operate as sensors 115 to provide data via the vehicle network or bus, e.g., data relating to vehicle 105 speed, acceleration, location, subsystem 120 and/or component status, etc. Further, other sensors 115, in or on a vehicle 105, stationary infrastructure element, etc., infrastructure could include cameras, short range radar, long range radar, LIDAR, and/or ultrasonic transducers, weight sensors 115, accelerometers, motion detectors, etc., i.e., sensors 115 to provide a variety of data. To provide just a few non-limiting examples, sensor 115 data could include data for determining a position of a component, a location of an object, a speed of an object, a type of an object, a slope of a roadway, a temperature, an presence or amount of moisture, a fuel level, a data rate, etc.

A vehicle network is a network via which messages can be exchanged between various devices in the vehicle 105. Computer 110 can be generally programmed to send and/or receive, via vehicle network, messages to and/or from other devices in vehicle 105 e.g., any or all of ECUs, sensors 115, actuators, components, communications module, a human machine interface HMI, etc. Additionally or alternatively, messages can be exchanged among various such other devices in vehicle 105 via vehicle network. In cases in which computer 110 actually comprises a plurality of devices, vehicle network 125 may be used for communications between devices represented as computer 110 in this disclosure. Further, as mentioned below, various controllers and/or vehicle sensors 115 may provide data to the computer 110. In some implementations, vehicle network can be a network in which messages are conveyed via a vehicle communications bus. For example, vehicle network can include a controller area network CAN in which messages are conveyed via a CAN bus, or a local interconnect network LIN in which messages are conveyed via a LIN bus. In some implementations, vehicle network can include a network in which messages are conveyed using other wired communication technologies and/or wireless communication technologies e.g., Ethernet, WiFi, Bluetooth, etc. Additional examples of protocols that may be used for communications over vehicle network in some implementations include, without limitation, Media Oriented System Transport MOST, Time-Triggered Protocol TTP, and FlexRay. In some implementations, vehicle network can represent a combination of multiple networks, possibly of different types, that support communications among devices in vehicle 105. For example, vehicle network can include a CAN in which some devices in vehicle 105 communicate via a CAN bus, and a wired or wireless local area network in which some device in vehicle communicate according to Ethernet or Wi-Fi communication protocols.

A vehicle subsystem 120 is a set of components or parts, including hardware components and typically also software and/or programming, to perform a function or set of operations in the vehicle 105. Vehicle subsystems 120 typically include, without limitation, a braking system, a propulsion system, and a steering system. The propulsion subsystem 120 converts energy to rotation of vehicle 105 wheels to propel the vehicle 105 forward and/or backward. The braking subsystem 120 can slow and/or stop vehicle 105 movement. The steering subsystem 120 can control a yaw, e.g., turning left and right, maintaining a straight path, of the vehicle 105 as it moves.

A computer 110 can be programmed to communicate with one or more remote sites such as a server 130, via a wide area network 125. The wide area network 125 can include one or more mechanisms by which a vehicle computer 110 may communicate with, for example, a remote server 130. Accordingly, the network 125 can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle to everything V2X such as cellular V2X CV2X, Dedicated Short Range Communications DSRC, etc., local area networks LAN and/or wide area networks WAN, including the Internet, providing data communication services.

Figure 2:
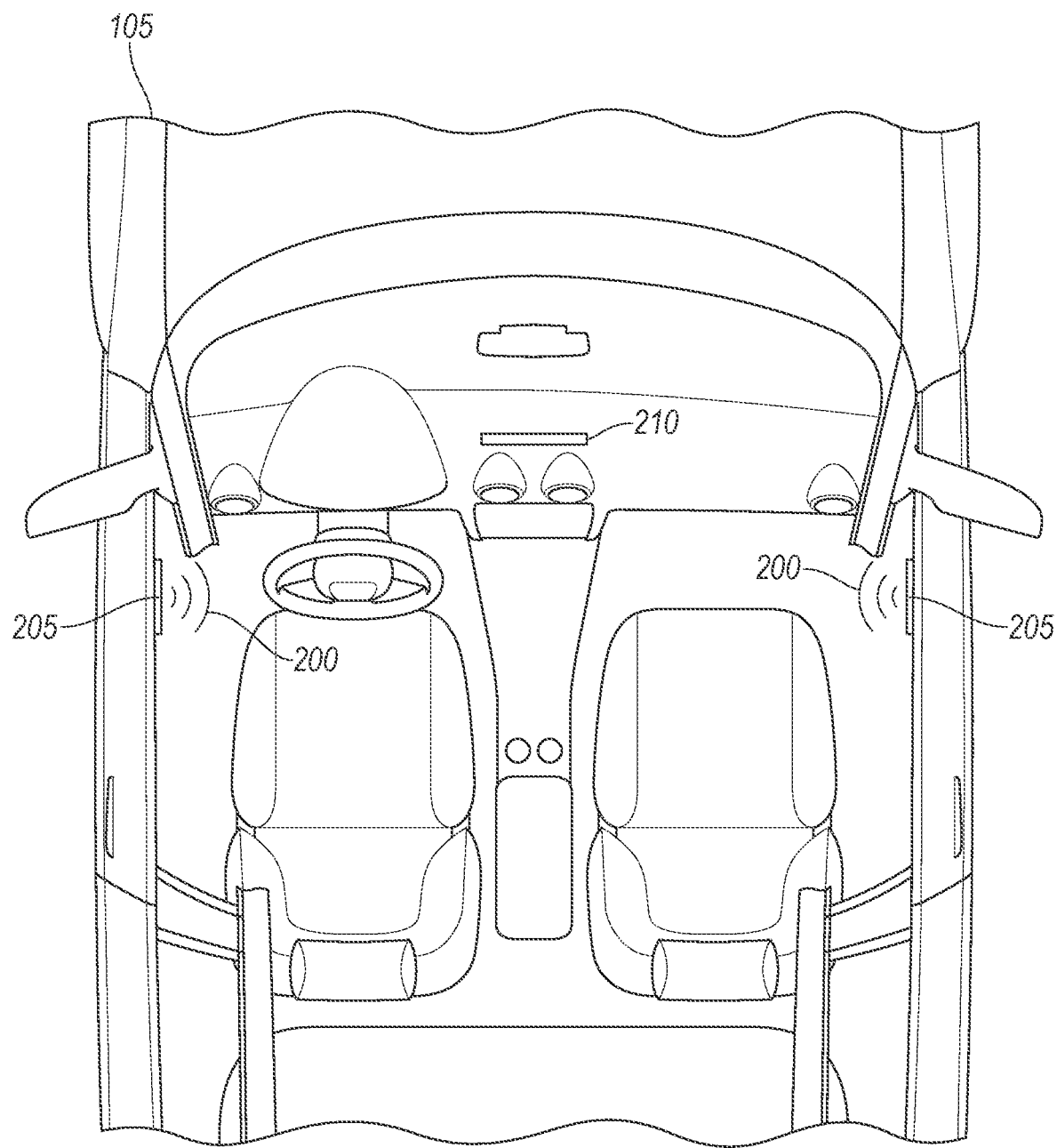
FIG. 2 is a view of a vehicle broadcasting the audio sample.

FIG. 2 is a view of an interior of a vehicle 105. As described below, a computer 110 in the vehicle 105 can receive an audio sample from an external server 130. The audio sample can include speech and ambient sounds. The computer 110 can broadcast the audio sample and record broadcast audio 200. The computer 110 can then recognize speech in the broadcast audio and transmit the recognized speech to the server 130.

The vehicle 105 includes at least one speaker 205. The speaker 205 generates and broadcasts sounds into the interior of the vehicle 105, e.g., the broadcast audio 200 of the audio sample. For example, the speaker 205 can be an acoustic transducer. In the example of FIG. 2, the vehicle 105 includes two speakers 205.

The vehicle 105 includes a microphone 210. The microphone 210 collects audio data from the interior of the vehicle 105. That is, the microphone 210 collects audio waves in the vehicle 105 and records the audio waves as audio data representing the broadcast audio 200 in the interior of the vehicle 105.

The computer 110 can broadcast the audio sample from the server 130 via the speaker 205. That is, the computer 110 can actuate the speaker 205 to generate the broadcast audio 200 into the interior of the vehicle 105. The computer 110 can actuate the microphone 210 to record the broadcast audio 200 generated by the speaker 205. That is, the computer 110 can actuate the microphone 210 to prepare to record the broadcast audio 200, and then the computer 110 can actuate the speakers 205 to broadcast the audio sample. This broadcast audio 200 from the speakers 205 is collected by the microphone 210 and stored in a memory of the computer 110.

Figure 3:
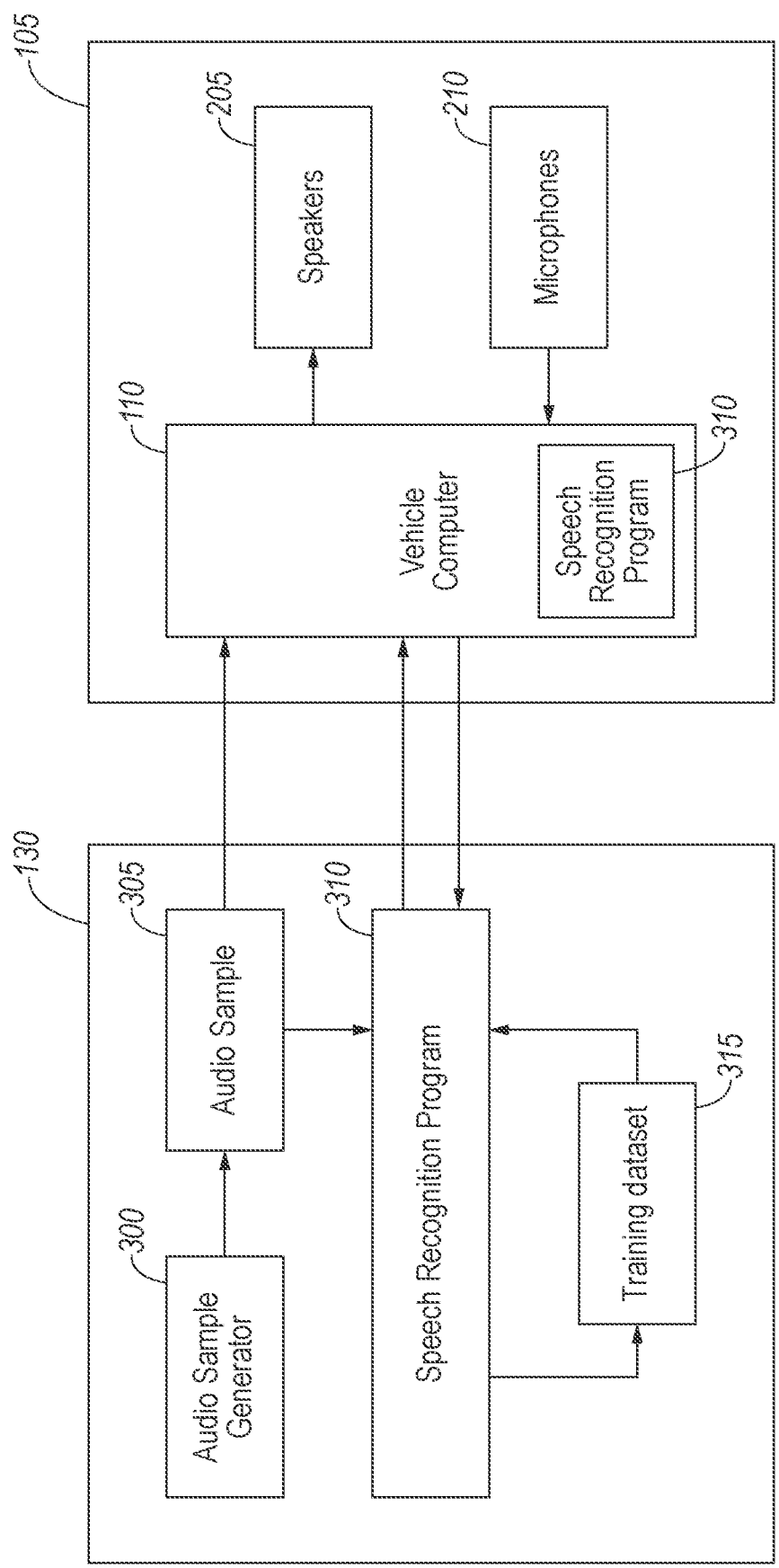
FIG. 3 is a block diagram of a server and a vehicle computer.

FIG. 3 is a block diagram of a server 130 and a computer 110 of a vehicle 105. The server 130 can generate an audio sample 305 with an audio sample generator program 300, as described below. The server 130 and the computer 110 can recognize speech in the broadcast audio 200 of the audio sample 305 broadcast in the vehicle 105 and can train a speech recognition program 310 based on the recognized speech, as described below.

The server 130 can include the audio sample generator program 300. The audio sample generator program 300 generates audio samples 305 that the computer 110 can broadcast in the vehicle 105. The audio sample generator program 300 can be a machine learning program trained to generate audio samples 305 based on input audio data. For example, the audio sample generator program 300 can be trained to output audio sample 305 including one or more specified strings of text (such as voice commands to actuate one or more vehicle subsystems 120), accents, or ambient sounds. That is, the audio sample generator program 300 can generate audio samples 305 with text, accents, and ambient sounds that may not be easily recorded in real-world situations. The audio samples 305 thus can train the speech recognition program 310 to recognize text in different accents and with different ambient sounds than may be available in a conventional real-world dataset. The audio sample generator program 300 thus can generate audio samples 305 that more closely resemble actual speech by users with different accents in different ambient environments than a conventional audio dataset may include. The audio sample generator program 300 can be, e.g., a generative adversarial network (GAN) such as WaveGAN (described by Donahue, et. al at the time of filing at https://arxiv.org/abs/1802.04208) or VoiceGAN (described by Gao et al. at the time of filing at https://arxiv.org/abs/1802.06840), trained to generate the audio samples 305 based on input training data including training text, training accents, and training ambient sounds.

The server 130 can transmit the audio sample 305 to the computer 110 of the vehicle 105. As described above, the server 130 can transmit the audio sample 305 via the wide area network 125. Upon receiving the audio sample 305 from the server 130, the computer 110 can broadcast the audio sample 305 via the speaker 205 and can record the broadcast audio 200 with the microphone 210. The server 130 can transmit the audio sample 305 to a plurality of vehicle computers 110, each computer 110 programmed, as described below, to broadcast the audio sample 305 and detect speech in the broadcast audio 200.

Upon recording the audio, the computer 110 can input the recorded audio to a speech recognition program 310. The speech recognition program 310 is a machine learning program that receives input audio and outputs recognized sounds indicating text spoken in the input audio. That is, provided recorded audio, the speech recognition program 310 identifies text in the recorded audio that the computer 110 can use to perform an action, e.g., to actuate one or more subsystems 120. Based on the speech recognized by the speech recognition program 310, the computer 110 can actuate one or more subsystems 120, as described below. The speech recognition program 310 can be a conventional machine learning program such as a neural network, e.g., as described in Graves, et al., "Towards End-to-End Speech Recognition with Recurrent Neural Networks," available at the time of filing at http://proceedings.mlr.press/v32/graves14.pdf, or Zhang et al., "Very Deep Convolutional Networks for End-to-End Speech Recognition," available at the time of filing at https://arxiv.org/pdf/1610.03022.pdf.

The computer 110 can determine whether the output of the speech recognition program 310 matches the text of the speech of the audio sample 305 provided by the server 130. The output of speech recognition program 310 "matches" the text of the speech of the audio sample 305 when a similarity measure of the output is within a similarity threshold of the text from the server 130. For example, the similarity measure can be a probability output from the machine learning algorithms of the speech recognition program 310, and the similarity threshold can be a value at which a cost function of the machine learning algorithms is below a training threshold. That is, the machine learning algorithms that underlie the speech recognition program 310 can output a probability that the output text is correct. When the probability that the output text is above a threshold, as determined by a manufacturer, the computer 110 can determine that the output of the speech recognition program 310 matches the text of the speech of the audio sample 305 from the server 130. In another example, the output matches the text from the server 130 when the computer 110 can actuate a same subsystem 120 according to the output of the speech recognition program 310 as a subsystem 120 actuated according to the text from the server 130. That is, if the output from the speech recognition program 310 causes the computer 110 to operate in a same manner as the text from the server 130, the output "matches" the text.

The computer 110 can send the recorded audio, the output of the speech recognition program 310, and the matching determination to the server 130. For example, the computer 110 can determine to send the recorded audio to the server 130 only when the computer 110 determines that the output from the speech recognition program 310 does not match the text from the server 130. That is, the computer 110 can send the recorded audio, the output of the speech recognition program 310, and a message indicating that the computer 110 failed to correctly identify the text in the broadcast audio 200 when the output from the speech recognition program 310 does not match the text from the server 130. Alternatively, the computer 110 can send the recorded audio, the output of the speech recognition program 310, and the matching determination regardless of whether the output from the speech recognition program 310 matches the text from the server 130. The server 130 can add the received recorded audio, speech recognition output, and matching determination to a training dataset 315 to retrain the speech recognition program 310 installed in the server 130. The server 130 can input collected recorded audio, speech recognition output, and matching determinations from a plurality of vehicle computers 110 to the training dataset 315, improving the training dataset 315 than with data from a single vehicle 105. Thus, the server 130 can retrain the speech recognition program 310 and transmit the updated program to the vehicles 105.

The server 130 can transmit the audio sample 305 upon receiving a message from the computer 110 that the vehicle 105 is stationary. When the vehicle 105 is moving, ambient sounds may be recorded by the microphone 210 in addition to the broadcast audio sample 305. To reduce recorded sounds other than the broadcast audio sample 305, the computer 110 can request the audio sample 305 when the computer 110 determines that the vehicle 105 is stationary, e.g., the vehicle 105 is powered off and in a parked state. Then, the server 130 can transmit the audio sample 305 to the computer 110.

The server 130 can, based on the recorded audio, detect a sound indicating a vibration from a vehicle 105 subsystem 120. In addition to identifying speech from a broadcast audio sample 305, the speech recognition program 310 can identify sounds from the subsystems 120 recorded by the microphone 210. The vibrations from the subsystems 120 can occur at predicted points in respective lifetimes of the subsystems 120 and/or when a variation occurs with the subsystem 120. A "variation" is a condition of a subsystem 120 indicating that the subsystem 120 should undergo maintenance. For example, a detected vibration may indicate a variation with a brake, indicating that the brake pads should be replaced. In another example, a detected vibration may indicate a variation with a suspension, indicating that the suspension stiffness should be adjusted. The sounds indicating the variation can be identified in empirical test settings and stored in an audio dataset that includes annotations identifying the variation and the subsystem 120 that should undergo maintenance when the sound indicating the vibration is detected.

The server 130 can detect a variation one of the subsystems 120 from recorded audio based on a prognostics model of the subsystem 120, i.e., by determining that a sound or sounds in recorded audio match (within a degree of confidence), a sound or sounds output by the prognostics model. A prognostics model is a program that models operation of the subsystem 120 throughout a lifetime of the subsystem 120 under typical operating conditions based on input operating data, i.e., data describing operation of the subsystem 120. For example, the prognostics model can output specific vibrations that the subsystem 120 may produce at specific points in the lifetime of the subsystem 120. In another example, the prognostics model can output vibrations that are produced when one or more variation occur in the subsystem 120. Example prognostics models for subsystems 120 can be found in Taheri et al, "Survey of prognostics methods for condition-based maintenance in engineering systems," available at the time of filing at https://arxiv.org/abs/1912.02708.

The server 130 can compare the sound indicating the vibration identified in the recorded audio from the computer 110 to vibrations predicted from the prognostics model. When the vibration from the recorded audio matches a vibration from the prognostic model that indicates a variation, the server 130 can detect a variation with the subsystem 120 and transmit the detected variation to the computer 110. The server 130 can input the recorded audio and output from the prognostic model to the training dataset 315.

Additionally or alternatively, the server 130 can provide commands to the computer 110 to actuate one or more subsystems 120 based on the detected variation. For example, upon detecting a vibration indicating a variation with a muffler in a hybrid-electric vehicle, the server 130 can instruct the computer 110 to transition to a fully electric mode. In another example, upon detecting a vibration indicating an attempt to close a vehicle door and receiving data from a door sensor indicating that the door did not close, the server 130 can instruct the computer 110 to actuate a horn to provide an alert. In another example, upon detecting a vibration indicating a variation with a fan of a climate control subsystem 120, the server 130 can instruct the computer 110 to actuate the fan at a different speed than a default speed to reduce noise caused by the fan. In another example, upon detecting a vibration indicating a worn brake pad, the server 130 can instruct the computer 110 to prevent actuation of a cruise control program that semi-autonomously or autonomously actuates a brake subsystem 120. Other examples of variation for which the server 130 can provide alerts include detecting vibrations indicating wind noise past an open window and/or clicking sounds indicating a low oil level.

Figure 4:
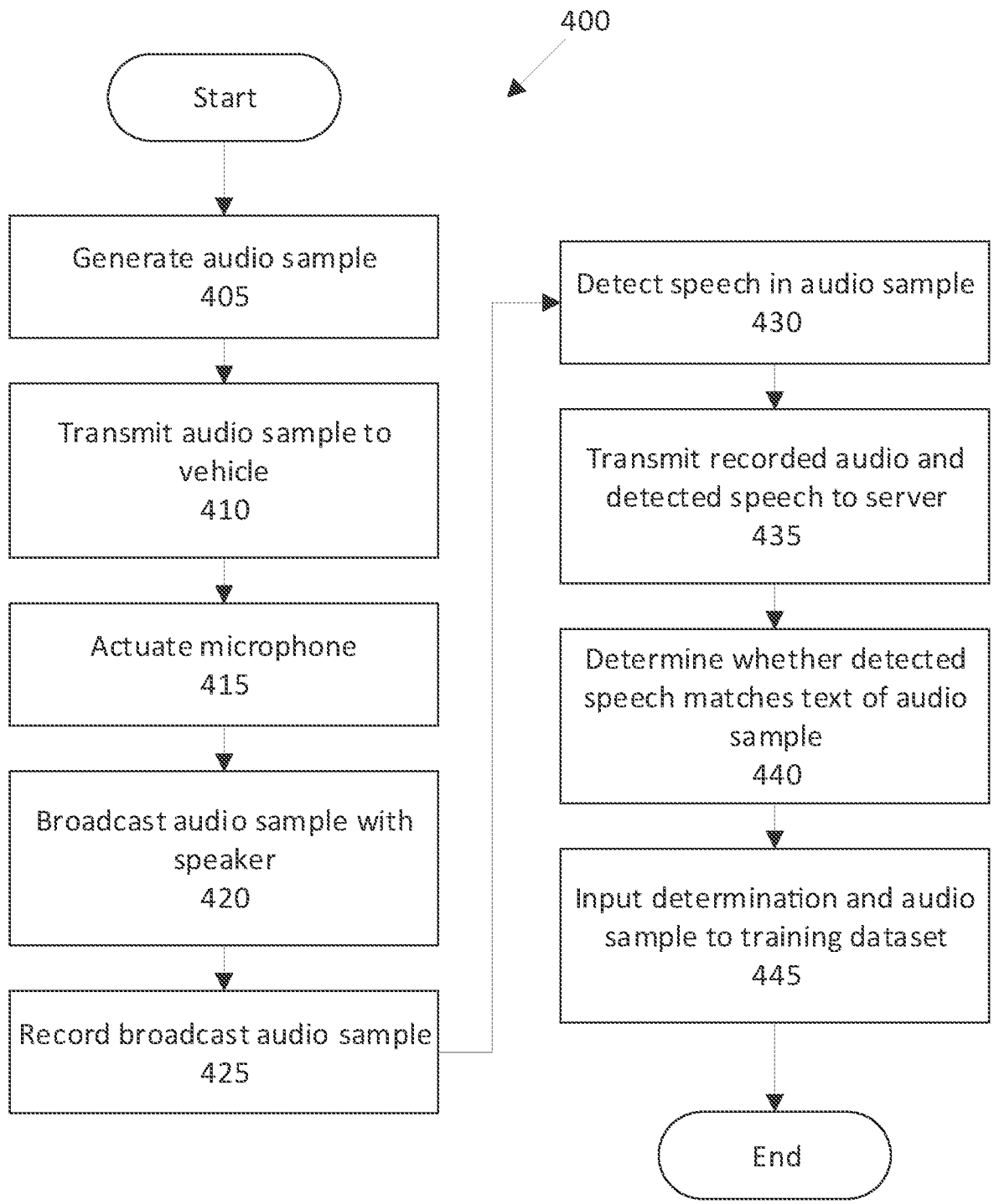
FIG. 4 is a block diagram of an example process for identifying text in the audio sample.

FIG. 4 is a block diagram of an example process 400 for detecting speech in recorded audio. The process 400 begins in a block 405, in which an audio sample generator program 300 in a server 130 generates an audio sample 305. As described above, the audio sample generator program 300 generates audio samples 305 that a computer 110 can broadcast in a vehicle 105. The audio sample generator program 300 can be a machine learning program trained to generate audio samples 305 based on input audio data. The audio sample 305 can include speech in a specified accent and/or additional background sounds.

Next, in a block 410, the server 130 transmits the audio sample 305 to the computer 110 of the vehicle 105. As described above, the server 130 can transmit the audio sample 305 via a wide area network 125.

Next, in a block 415, the computer 110 can actuate a microphone 210 in the vehicle 105. As described above, the microphone 210 records sounds broadcast in the vehicle 105. The computer 110 actuates the microphone 210 to prepare to record broadcast audio 200 from the speakers 205.

Next, in a block 420, the computer 110 broadcasts the audio sample 305 from one or more speakers 205 into the interior of the vehicle 105. As described above, the computer 110 can actuate the speaker 205 to generate broadcast audio 200 according to the audio sample 305 received from the server 130.

Next, in a block 425, the computer 110 records the broadcast audio sample 305 with the microphone 210. As described above, the microphone 210 records the broadcast audio 200 in the vehicle 105 as audio data.

Next, in a block 430, the computer 110 inputs the recorded audio data to a speech recognition program 310 to identify speech in the audio data. As described above, the speech recognition program 310 is a machine learning program trained to output recognized speech in recorded audio. For example, the speech recognition program 310 can be a neural network.

Next, in a block 435, the computer 110 transmits the recorded audio and recognized speech to the server 130. The computer 110 can transmit the recorded audio and the output from the speech recognition program 310 via the wide area network 125.

Next, in a block 440, the server 130 determines whether the recognized speech from the computer 110 matches text of the audio sample 305 determined by the server 130. As described above, the server 130 can input the audio sample 305 to a speech recognition program 310 stored on the server 130 to output text of the speech in the audio sample 305. The server 130 determines whether the speech recognition program 310 of the computer 110 correctly recognized speech in the audio sample 305, i.e., whether the recognized speech "matches" the text of the speech in the audio sample 305.

Next, in a block 445, the server 130 inputs the audio sample 305, the received recorded audio, and the matching determination to a training dataset 315 for the speech recognition program 310. As described above, by using data from one or more vehicles 105, the server 130 can generate a more diverse dataset than a vehicle 105 could generate on its own. The server 130 can retrain the speech recognition program 310 with the training dataset 315 and transmit the updated speech recognition program 310 to one or more vehicles 105. Following the block 445, the process 400 ends.

Figure 5:
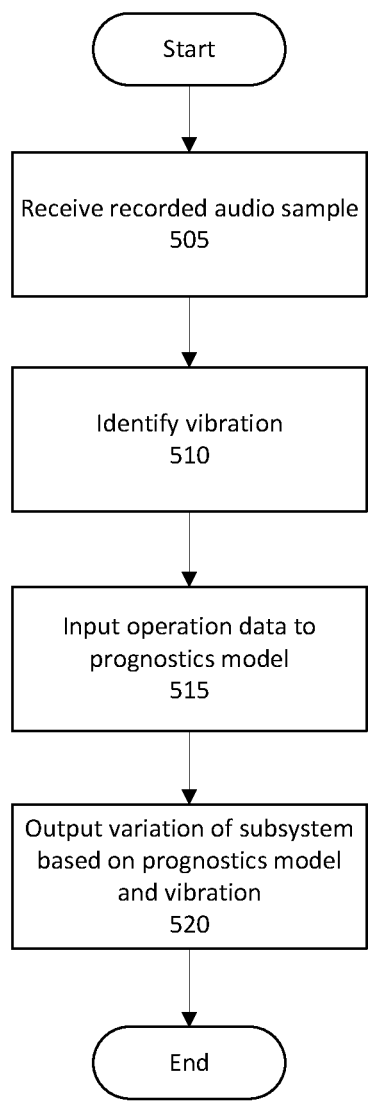
FIG. 5 is a block diagram of an example process for identifying variation in vehicle subsystems based on the audio sample.

FIG. 5 is a block diagram of an example process 500 for identifying a variation with a vehicle 105 subsystem 120. The process 500 begins in a block 505, in which a server 130 receives a recorded audio sample 305 and operation data of one or more subsystems 120 from a computer 110 of a vehicle 105. As described above, the recorded audio sample 305 is a recording of audio data form a microphone 210 in an interior of the vehicle 105.

Next, in a block 510, the server 130 identifies a vibration in the recorded audio sample 305. As described above, a speech recognition program 310 stored in the server 130 can identify one or more vibrations of subsystems 120 in the recorded audio sample 305.

Next, in a block 515, the server 130 inputs the vibration and the operation data received from the computer 110 to a prognostics model. The prognostics model is a program trained to identify variation of operation of one or more vehicle subsystems 120, as described above.

Next, in a block 520, the server 130 outputs a detection of a variation of the subsystem 120 from the prognostics model. As described above, the prognostics model can output a determination of whether the data from the subsystem 120 differ from expected operation of the subsystem 120, i.e., the variation. Based on the output, the server 130 can transmit the variation detection to the computer 110 with instructions to perform maintenance on the subsystem 120. Following the block 520, the process 500 ends.

Computer 110 executable instructions may be compiled or interpreted from computer 110 programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer 110 readable medium, etc., and executes these instructions, thereby performing one or more processes, including one or more of the processes described herein. Such instructions and other data may be stored and transmitted using a variety of computer 110 readable media. A file in a networked device is generally a collection of data stored on a computer 110 readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in response to, based on, and upon determining herein indicates a causal relationship, not merely a temporal relationship.

As used herein, the adverb substantially means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a computer including a processor and a memory, the memory storing instructions executable by the processor to:
    transmit, via a network, an audio sample including speech and ambient sounds to a vehicle computer;
    broadcast the audio sample in a vehicle of the vehicle computer;
    record, from the vehicle computer, audio from the audio sample;
    recognize, by the vehicle computer, speech in the recorded audio from the audio sample;
    receive, via the network from the vehicle computer, the recorded audio including the audio sample;
    receive, via the network from the vehicle computer, the recognized speech from the recorded audio;
    identify text of the recognized speech from the recorded audio;
    input the recognized speech and the identified text of the recognized speech to a machine learning program that outputs whether the recognized speech matches the identified text; and
    when the output from the machine learning program indicates that the recognized speech does not match the text include the recognized speech and the text in a training dataset for the machine learning program;
    wherein the machine learning program is trained to output, from the recorded audio, a detection of a vibration from a vehicle subsystem indicating potential maintenance for the vehicle subsystem; and
    identify a variation in the vehicle subsystem based on the output detected vibration from the recorded audio and a vibration predicted by a prognostics model of the vehicle subsystem.

2. The system of claim 1, wherein the instructions further include instructions to generate the audio sample with a second machine learning program trained to output audio samples including speech and ambient sounds.

3. The system of claim 2, wherein the audio sample includes speech of a voice command to actuate one or more vehicle subsystems.

4. The system of claim 1, wherein the instructions further include instructions to receive, from the vehicle computer, a message indicating that the vehicle computer did not recognize speech from the recorded audio broadcast and to include the audio sample and the message in the training dataset.

5. The system of claim 1, wherein the instructions further include instructions to receive a message from the vehicle computer indicating that a vehicle in which the vehicle computer is located is stationary, and then transmit the audio sample to the vehicle computer based on receiving the message indicating that the vehicle in which the vehicle computer is located is stationary.

6. The system of claim 1, wherein the instructions further include instructions to transmit the detected variation to the vehicle computer.

7. The system of claim 1, wherein the instructions further include instructions to input the detected vibration in the training dataset for the machine learning program.

8. The system of claim 1, wherein the vehicle computer is further programmed to, upon receiving the audio sample, to actuate a speaker to broadcast the audio sample and to actuate a microphone to record the broadcast audio sample.

9. The system of claim 8, wherein the vehicle computer is further programmed to input the recorded audio to a speech recognition program trained to output speech recognized from the recorded audio.

10. The system of claim 8, wherein the vehicle computer is further programmed to actuate each of a plurality of speakers to broadcast the audio sample and to actuate the microphone to record the audio sample broadcast from each of the plurality of speakers.

11. The system of claim 1, wherein the instructions further include instructions to transmit the audio sample to each of a plurality of vehicle computers, each vehicle computer located in a respective vehicle, and to receive recorded audio and recognized speech from each of the plurality of vehicle computers.

12. The system of claim 11, wherein the instructions further include instructions to input respective recognized speech and text of the speech from each of the plurality of vehicle computers to the training dataset of the machine learning program.

13. The system of claim 1, wherein the instructions further include instructions to retrain the machine learning program with the training dataset and to transmit the retrained machine learning program to the vehicle computer.

14. A method, comprising:
- transmitting, via a network, an audio sample including speech and ambient sounds to a vehicle computer;
- broadcasting the audio sample in a vehicle of the vehicle computer;
- recording, from the vehicle computer, audio from the audio sample;
- recognizing, by the vehicle computer, speech in the recorded audio from the audio sample;
- receiving, via the network from the vehicle computer, the recorded audio including the audio sample:
- receiving, via the network from the vehicle computer, the recognized speech from the recorded audio;
- identifying text of the recognized speech from the recorded audio;
- inputting the recognized speech and the identified text of the recognized speech to a machine learning program that outputs whether the recognized speech matches the identified text; and
- when the output from the machine learning program indicates that the recognized speech does not match the text, including the recognized speech and the text in a training dataset for the machine learning program;
- wherein the machine learning program is trained to output, from the recorded audio, a detection of a vibration from a vehicle subsystem indicating potential maintenance for the vehicle subsystem; and
- identifying a variation with the vehicle subsystem based on the output detected vibration from the recorded audio and a vibration predicted by a prognostics model of the vehicle subsystem.

15. The method of claim 14, further comprising generating the audio sample with a second machine learning program trained to output audio samples including speech and ambient sounds.

16. The method of claim 14, further comprising receiving, from the vehicle computer, a message indicating that the vehicle computer did not recognize speech from the recorded audio broadcast and including the audio sample and the message in the training dataset.

17. The method of claim 14, further comprising receiving a message from the vehicle computer indicating that a vehicle in which the vehicle computer is located is stationary, and then transmitting the audio sample to the vehicle computer.

18. The method of claim 14, wherein the vehicle computer is further programmed to, upon receiving the audio sample, to actuate a speaker to broadcast the audio sample and to actuate a microphone to record the broadcast audio sample.

* * * * *